United States Patent [19]

Hellestam et al.

[11] Patent Number: 4,895,386
[45] Date of Patent: Jan. 23, 1990

[54] BICYCLE WITH A COLLAPSIBLE FRAME

[76] Inventors: Sven Hellestam, KåSerigaten 2, S-422 42 Hisings-Backa; Otto Linander, Kungshöjdsgatan 1, S-411 20 Göteborg, both of Sweden

[21] Appl. No.: 96,533

[22] Filed: Sep. 15, 1987

[30] Foreign Application Priority Data

Sep. 16, 1986 [SE] Sweden ................................ 8603880

[51] Int. Cl.⁴ ............................................. B62K 15/00
[52] U.S. Cl. ..................................... 280/287; 280/278; 403/102
[58] Field of Search ..................... 280/278, 287, 281 R; 403/102, 101

[56] References Cited

U.S. PATENT DOCUMENTS

| | | | |
|---|---|---|---|
| 2,777,711 | 1/1957 | Yokomaki | 280/287 |
| 3,294,416 | 12/1966 | Carnielli | 280/278 |
| 3,645,212 | 2/1972 | Dahlstrom | 403/102 X |
| 3,865,403 | 2/1975 | Majerus | 280/287 |
| 4,182,522 | 1/1980 | Ritchie | 280/278 |
| 4,440,414 | 4/1984 | Wang | 280/278 X |
| 4,582,335 | 4/1986 | Paioli et al. | 280/278 |
| 4,611,945 | 9/1986 | Diego | 403/102 X |

FOREIGN PATENT DOCUMENTS

| | | |
|---|---|---|
| 309357 | 6/1917 | Fed. Rep. of Germany . |
| 1084159 | 6/1960 | Fed. Rep. of Germany ...... 280/278 |
| 1443948 | 5/1966 | France ................................ 280/287 |
| 6739 | 5/1898 | Norway ............................... 280/287 |
| 472054 | 9/1975 | U.S.S.R. .............................. 280/287 |
| 548348 | 10/1942 | United Kingdom ................. 280/287 |
| 578384 | 6/1946 | United Kingdom ................. 280/287 |
| 604113 | 6/1948 | United Kingdom ................. 280/287 |
| 1267674 | 3/1972 | United Kingdom . |
| 2171656 | 9/1986 | United Kingdom . |

*Primary Examiner*—Mitchell J. Hill
*Attorney, Agent, or Firm*—Cushman, Darby & Cushman

[57] ABSTRACT

A bicycle with collapsible frame, which incorporates front and rear frame posts and at least one cross-beam interconnecting said frame posts. The bicycle, which with one of a few simple hand manipulations, in a few seconds, can be folded into a compact unit. The bicycle has an absolutely rigid frame when the bicycle is in its position of use, and in collapsed position it is only little bulky with a substantial extension in one direction only. The cross-beam of the frame is a two-part cross-beam. The two parts of the cross-beam are articulatedly connected to each other and to the frame posts. The two parts of the cross-beam at folding of the frame are pivotable towards the front and the rear frame posts respectively.

13 Claims, 7 Drawing Sheets

BICYCLE WITH A COLLAPSIBLE FRAME

The present invention relates to a bicycle with a collapsible frame, which incorporates front and rear frame posts and at least one cross-beam interconnecting said frame posts.

BACKGROUND OF THE INVENTION

Collapsible bicycles have been proposed earlier in a large number of variations and with different folding principles. German Patent Specification 1.084.159 thus describes a collapsible bicycle, in which the two wheels, when the bicycle is in a collapsed condition, are situated close to each other, which folding method as proven itself to be the most space-saving.

A drawback with earlier known collapsible bicycles is that the bicycle has to be dismantled, whereby is obtained several separate parts, beside the fact that the folding requires use of special tools. The above-mentioned Patent Specification has tried to set aside this problem by displacing certain frame parts along frame posts and by unhooking other frame posts instead of unscrewing them, but this requires efficient clamping joints and necessitates several complex hand manipulates beside requiring rather strong power for tightening and releasing the clamp couplings. It is also known to fold the bicycle frame about one or mroe mainly vertical pivot axes, but the volume reduction obtained is indifferent and the collapsed bicycle is still bulky.

The collapsible bicycle has not become a success up until now, and the reason for this is the contradictory functional requirements, at one hand for stability and on the other hand for a simple manner of collapsing the bicycle. The latter requirement necessitates a plurality of joints, which, from stability aspects, always presents problems, particularly if they shall also be dismountable. Beside stabillity and simple collapsibility, the bicycle shall have low wiehgt, but it shall also be easy to handle, i.e. it shall be possible to handle as one unit, when collapsed. A plurality of loose or partially continuous, joint-less details will become difficult to handle and to transport and there is a big risk that one part or some parts are lost.

SUMMARY

The purpose of the present invention is to provide a bicycle of the type mentioned in the introductory part, which shall have the following properties:

A. It shall be collapsible into a compact unit in a few seconds and with one or a few simple hand manipulates;
B. It shall have low weight;
C. It shall have an absolutely rigid frame in its position of use;
D. It shall, in collapsed position, be only in a little bulky and have a substantial extension in one direction, i.e. it shall have the shape of an elongated, easily handled packagge;
E. It shall, in its optimum embodiment, be collapsible with the wheels situated beside each other, without any part having to be dismounted;
F. The folding-out shall be as easy and smooth as the collapsing;
G. The frame shall be energy-absorbing, e.g. when running into a hindrance.

BRIEF DESCRIPTION OF THE DRAWINGS

Herebelow, the invention will be further described with reference to the accompanying drawings, which show some embodiments.

DETAILED DESCRIPTION OF EMBODIMENTS

Figure 1:
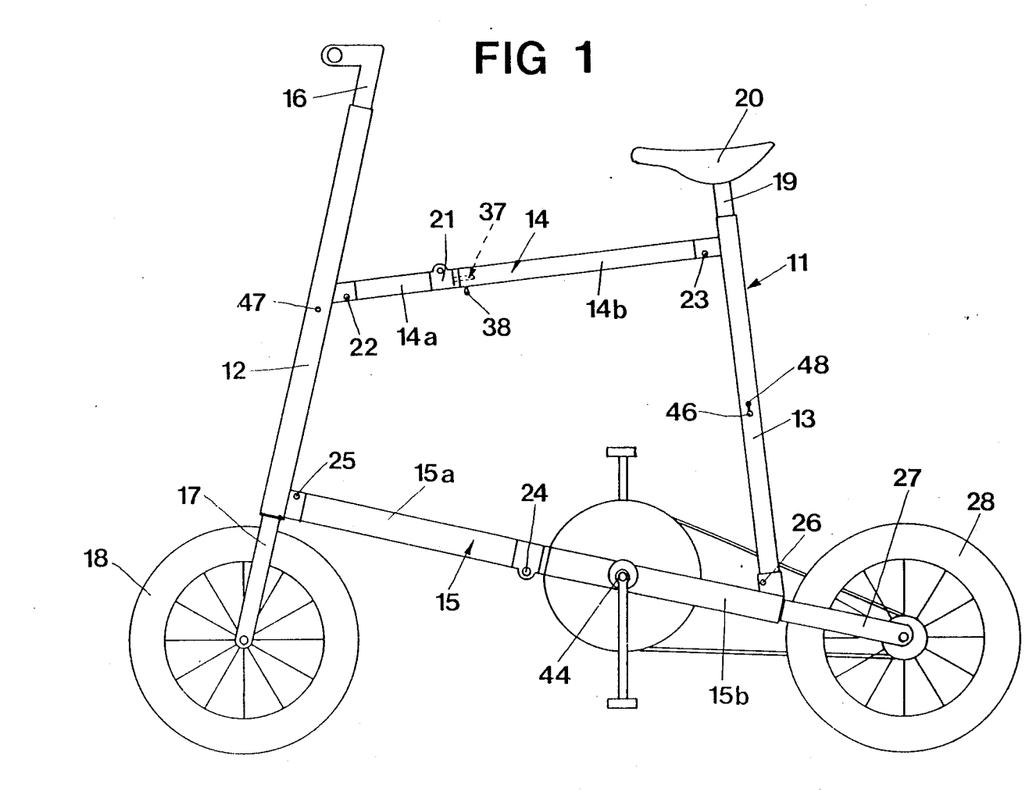
FIG. 1 shows an embodiment of the bicycle according to the invention in a side elevation view in a fully-erected position, ready for use.

The bicycle according to the invention consists largely of standard parts, however with exception of the frame 11, which is designed according to a folding principle. The frame consists of four frame parts, a front frame post 12, a rear frame post 13 and an upper and a lower cross-beam 14 and 15. These frame parts form an irregular polygon, in the embodiment shown. The front frame post 12, constituted by a tube of circular cross-section, in its upper part is designed as an attachment for a handle bar 16 and at its lower part as a journal for the front wheel fork 17 of the front wheel 18. Also, the rear frame post 13 consists of a tube with circular cross-section, which in its upper part is designed as a guide for the saddle bar 19 of the saddle 20. The upper, as well as the lower cross-beams 14 and 15 are two-part, i.e. they consist each of two articulatedly interconnected parts 14a, 14b and 15a, 15b, respectively. Between the parts 14a and 14b is provided a joint 21, whereas the opposite end of the part 14a, via a joint 22, is connected to the front frame post 12. The other part 14b, with its opposite end, is articulatedly connected to the rear frame post 13 via a joint 23. The joints 21, 22 and 23 are positioned thus, that—at a folding of the frame 11—the part 14a is pivotable towards the front frame post 12 and the part 14b towards the rear frame post 13.

Figure 2:
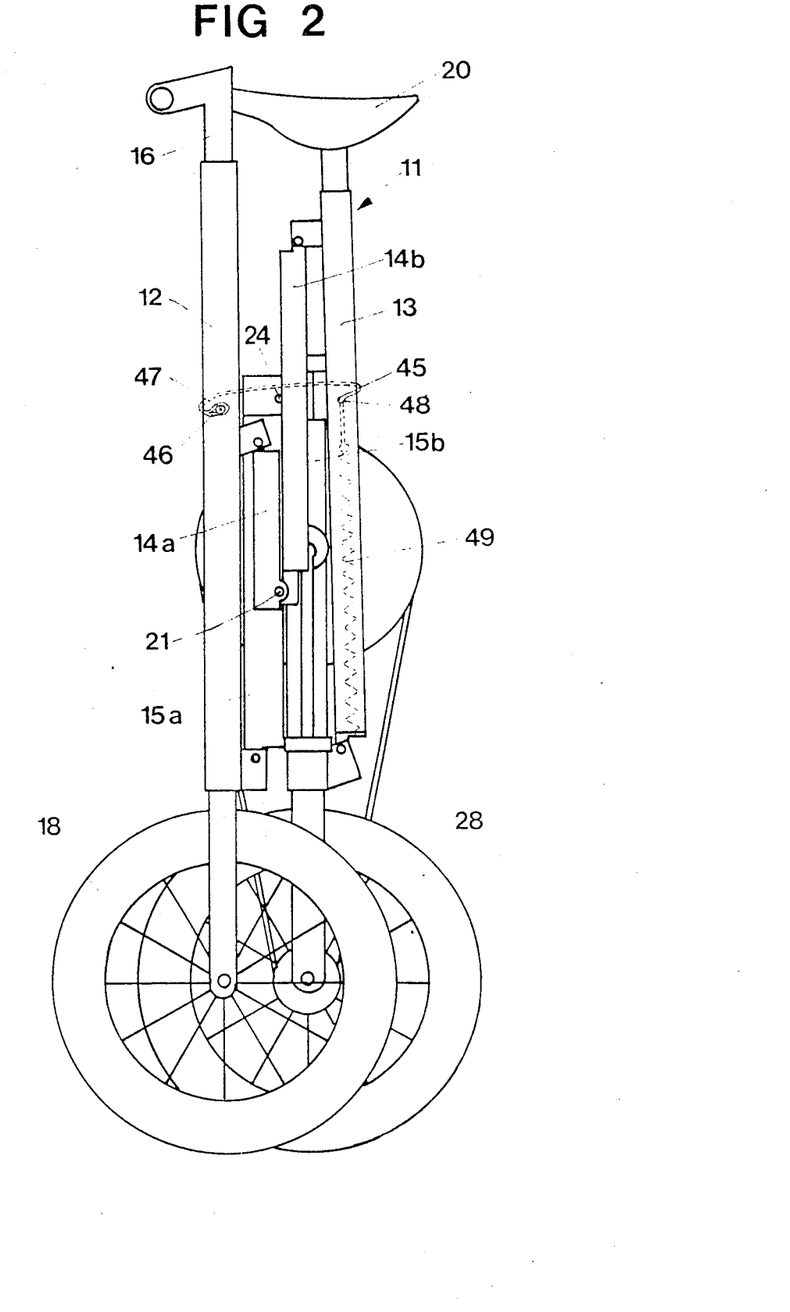
FIG. 2 shows on a larger scale, the bicycle according to FIG. 1, in collapsed position, also in side elevation view.
Figure 3:
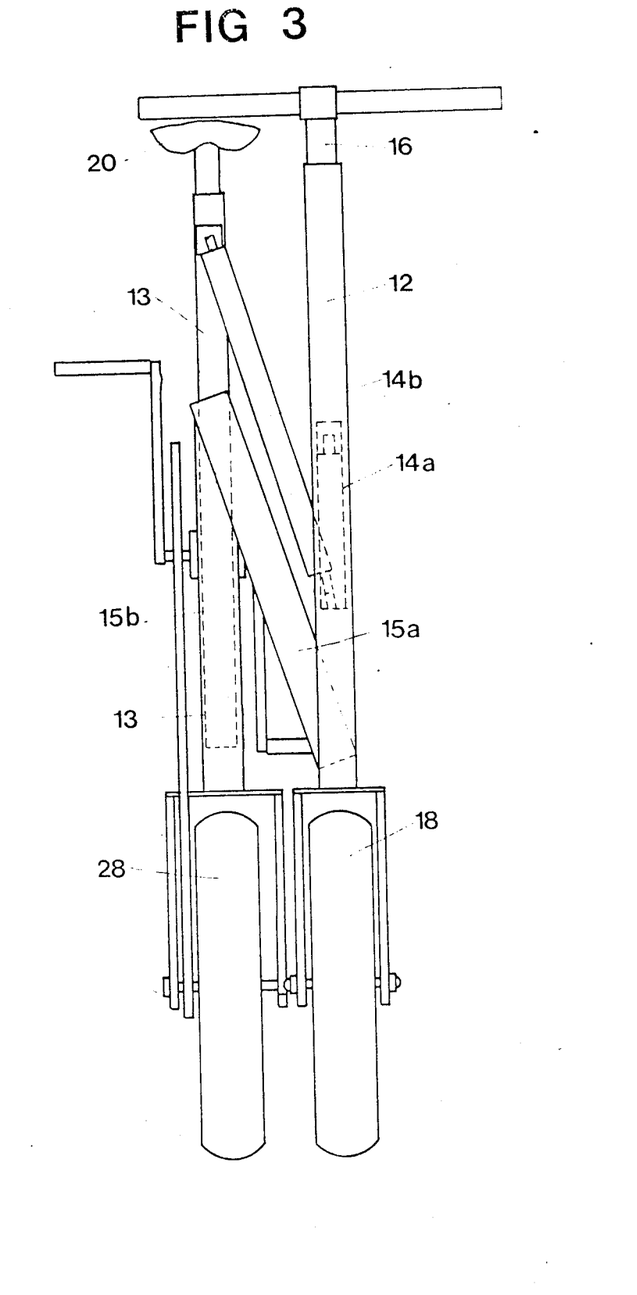
FIG. 3 shows the collapsed bicycle according to FIG. 2 in a front elevation view.
Figure 9:
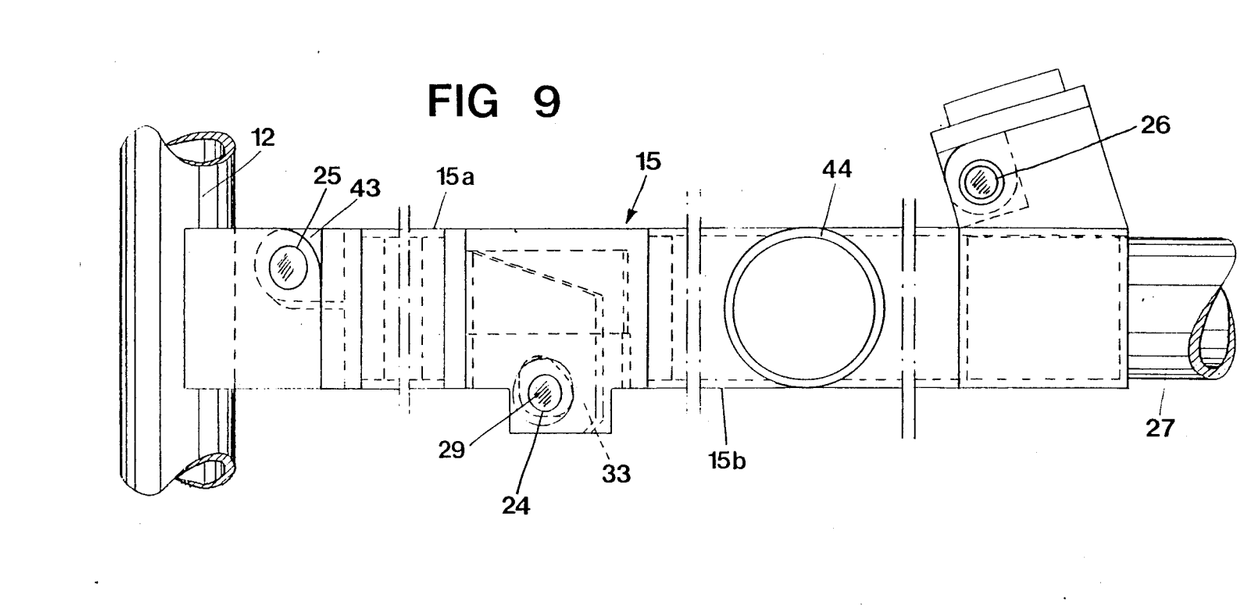
FIG. 9 shows the lower cross-beam of the frame, in side elevation view.

The lower cross-beam 15, in the same manner as the upper cross-beam 14, is equipped with a centre joint 24 between the parts 15a and 15b. The opposite end of the part 15a is articulatedly connected to the front frame post 12 via the joint 25, whereas the rearmost end of the second part 15b is articulatedly connected to the rear frame post 13 via the joint 26. This is arranged on the upper side of the free end of the part 15b, whereby this part can serve as an attachment for a rear wheel fork 27. The joints 24, 25 and 26 are positioned, thus that, when the frame is folded, the part 15a is pivotable towards the front frame post, whereas the part 15b is pivotable towards the rear frame post 13. All of the joints 21, 22, 23, 24, 25 and 26 are so-called toggle joints, i.e. they are foldable from an end position in which the two parts 14a, 14b and 15a, 15b respectively are situated in the extension of each other, in one direction only, to a position in which the frame is collapsed, such as shown in FIGS. 2 and 3.

For convenience in description, the joints 21, 22, 23, 24, 25, 26 are respectively designated as the first, second, third, fourth, fifth and sixth joints.

In order to make possible a positioning of the front wheel 18 beside the rear wheel 28, with the front and rear frame posts 12, 13 situated adjacent each other, it is necessary that the joints 21 and 23 at the upper cross-beam 14 and the joints 24 and 25 at the lower cross-beam 15 are displaceable laterally. This can be provided for, e.g. by making said joints angular, thus that the frame posts 12 and 13 at folding can be displaced laterally in relation to each other. the lateral displacement is made possible by the fact that the pivot axes 29 of the angular joints, 21, 23, 24 and 25 form respective acute angles to a normal to the longitudinal direction of the associated cross-beam 14 or 15, respectively. In order to guarantee a maximum stability in extended position of the frame, i.e. in the active bicycle position, but at the same time to make possible a smooth and simple folding, without the pivot surfaces of the joints thereby becoming jammed, the intermediate joints 21 and 24 are designed thus, that they have a very high degree of fit accuracy, when the joint is in its extended position according to FIGS. 4 and 5, whereas the joints in folded position have large play. This, in itself contradictory task, has been solved in that each one of the joints 21 and 24 consists of a U-shaped female part 30 and a male part 31, where the female part within the shanks of the U, is designed with opposed pivot portions 32, between which the corresponding joint pin 33 of the male part is insertable with a high accuracy of fit. The pivot portion 32 in the female portion has a limited extension in a direction towards the pivot pin 29, which means that the pivot pin 33, when the joint is folded about the pivot axis 29, gradually will leave the pivot portion 32 and enter an area 34 having a substantially larger play, i.e. substantially larger width, than the thickness of the pivot pin 33.

Figure 4:
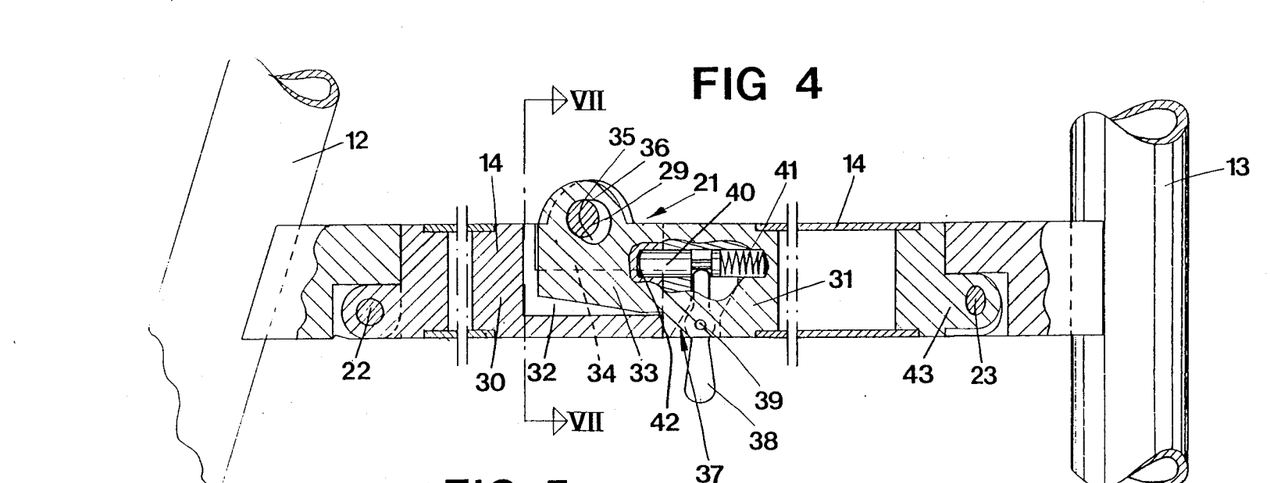
FIG. 4 shows a fragmentary, larger-scale side elevation view, a vertical section through the upper cross-beam of the frame.
Figure 5:
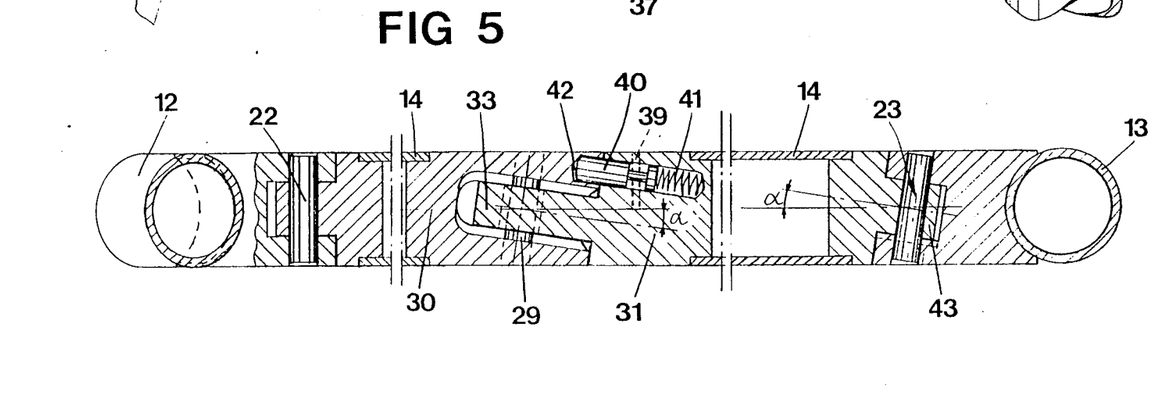
FIG. 5 shows on a fragmentary, larger-scale top plan view, a horizontal section through the upper cross-beam for study in conjunction with FIG. 4.
Figure 6:
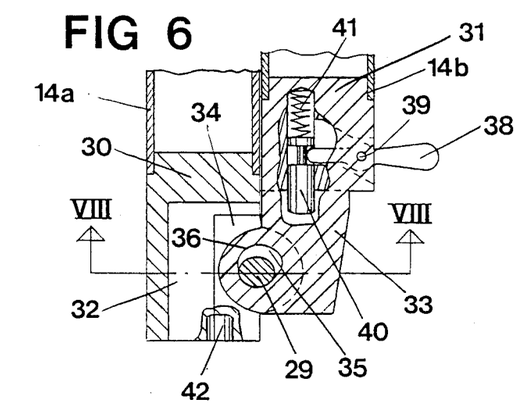
FIG. 6 shows a section through the centre pivot of the upper cross-beam, in folded position.
Figure 7:
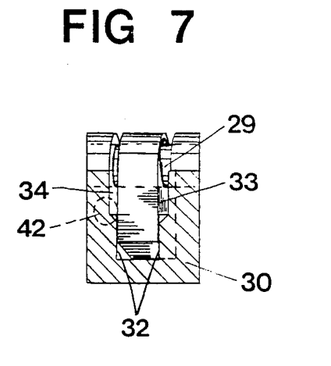
FIG. 7 shows a section taken along line VII—VII in FIG. 4.
Figure 8:
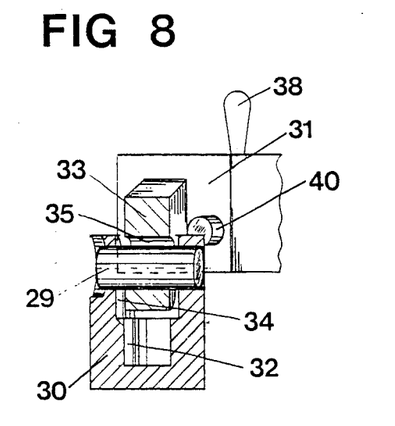
FIG. 8 shows a section taken along line VIII—VIII in FIG. 6.

The pivot axis 29, which is non-rotatably arranged in the female part 30, projects through an opening 35 in the pivot pin 33, which opening is provided with an enlarged portion 36, which makes it possible further to increase the angular setting of the cross-beam portions 14a and 14b relative to each other, thus that the folding process will proceed without friction and the collapsed bicycle is obtained as a compact and smooth package.

As the cross-beams 14, 15 are foldable in direction towards each other is it necessary that the joint 21 of the cross-beam 14 is equipped with a locking device 37, which, e.g. can incorporate an operating lever 38 in the form of double-armed lever, which is pivotable about a shaft 39. The operating lever 38 cooperates with a locking bolt 40, which is held in locking position by a spring 41. In this position, the forward end portion of the locking bolt is situated in a bore 42 in the female part 30, whereby the joint is locked, such as can be seen from FIG. 4. By pulling the locking bolt 40 backwards by actuation of the operating lever 38, the two joint halves are relieved, whereby they can pivot relative to each other.

In the same manner as joint 21, the joint 23 is also an angular joint, the pivot pin 43 of which, in the embodiment shown, forms mainly the same angle to the horizontal longitudinal medial plane of the cross-beam 14 as the joint pin 33. The pivot pin 43 is furthermore arranged at an angle to the vertical longitudinal medial plane of the cross-beam, thus that the folding and unfolding, i.e. the displacement laterally of the front frame post relative to the rear frame post 13, can take place without the frame portions jamming or blocking themselves. The joint 23, however, has not possibility of larger play in its folded position.

The joint 22 is a conventional toggle joint, which means that the cross-beam portion 14a is pivotable in the axial plane of the front frame post 12, whereas the other cross-beam portion 14b at folding of the frame thus is pivotable angularly towards the rear frame post 13.

The joints 24, 25 and 26 of the lower cross-beam 15 are, in principle of the same construction as the joints 21, 22 and 23 of the upper cross-beam 14, whereby the intermediate joint 24 corresponds to joint 21, with the exception that the joint 24 has no locking device 37. The joint 25 furthermore corresponds structurally to the angular joint 23, and the joint 26 corresponds to joint 22. The joints 24, 25 and 26 are turned 180° relative to the corresponding joints of the upper cross-beam 14.

A crank bearing housing 44 is arranged on the cross-beam portion 15b, and its position is not altered at folding, and the chain therefore need not be adjusted after each unfolding. For holding the frame posts and cross-beams of the collapsed bicycle in a compact package, the bicycle also can be equipped with a retaining device 45, which e.g. can be a wire, which in one of its ends is provided with a loop 46 or the like, which can be threaded over a hook 47 at the front frame post 12. The rear end of the wire is threaded thorugh a hole 48 in the rear frame post 13 and is connected to a tension spring 49, which at one hand will keep the wire stretched about the collapsed bicycle and which on the other hand can pull the wire into the bar, except for its loop 46, when the bicycle is un-folded.

Folding of the bicycle according to the invention is effected with a single hand manipulation, in that the locking device 37 is disengaged by actuation of the operating lever 38, whereby the two cross-beams 14 and 15 can be folded towards each other and to engagement against the front and the rear frame post respectively, whereupon the collapsed bicycle package is fixed in this position by means of the retaining device 45. The unfolding is effected still more simply as it is only necessary to remove the retaining device 45 to allow the bicycle, by means of its own weight, to resume its unfolded, active position.

Figure 10:
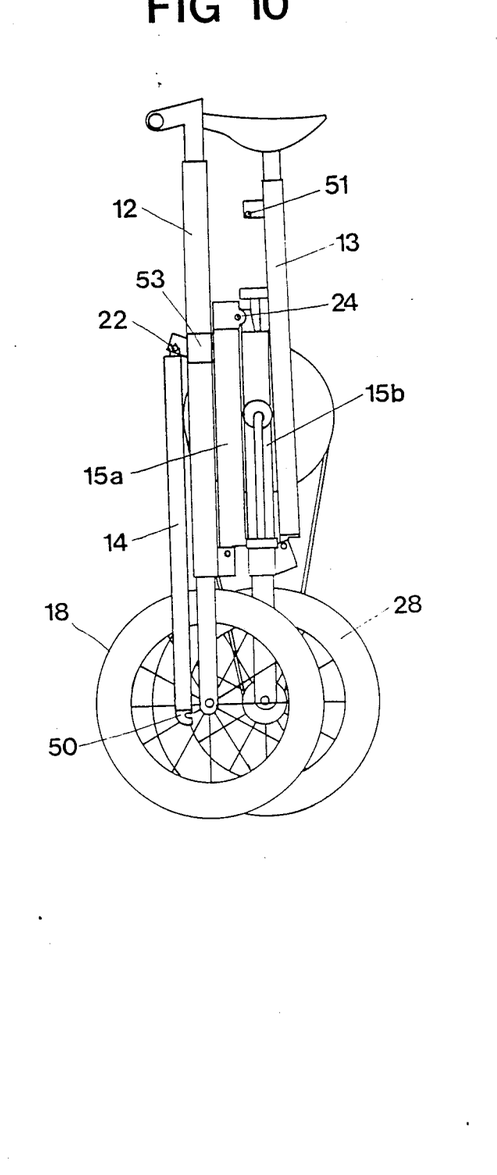
FIG. 10 shows in side elevation a modified embodiment of the bicycle according to the invention, in its collapsed position.

A more simple variant of the invention, which, however, requires somewhat more work at folding and unfolding, is shown in FIG. 10, wherein the upper cross-beam 14 is made in one piece, i.e. it has not intermediate pivot joint 21. The free end portion of the cross-beam is designed as a hook 50, instead of having a joint 23, which hook with a simple hand grip can be connected to an attachment 51 provided at the rear frame post and which can also be locked to this. The joint 22 is arranged at a sleeve 53, which is rotatable about the front frame post 12, but is axially non-displaceable thereon.

At folding of the bicycle, the hook is released from the attachment 51, whereupon the upper cross-beam is rotated 180° about the front frame post 12, thus that the upper cross-beam 14 can be pivoted to a position parallel to front frame post 12 and its front wheel fork. Otherswise, the bicycle has all the structural features described in the preceding embodiment.

The invention is not limited to the embodiments shown, but a plurality of variations are possible within the scope of the claims. It is thus of course not necessary that upper crossbeam is located directly below the bicycle saddle, but it can be arranged much nearer to the lower cross-beam, possibly also in parallel thereto for the purpose of creating a lady's bicycle. The angular joints may have other or mutually different angles and the frame portions may be of other lengths that those shown. The joints may also differ structurally from those defined in the embodiments and shown in the drawings. It is thus possible that the intermediate joints 21 and/or 24 are straight joints, if the angular displacement is taken up entirely by the or those other joints. It is further possible to use the particular angular joints one by one or in combinations for other applications and in other connections.

What we claim is:

1. A collapsible-frame bicycle, comprising:
   a front post having a front wheel rotatably mounted thereto;
   a rear post having a rear wheel rotatably mounted thereto;
   at least one cross-beam interconnecting said front post and said rear post;
   said cross-beam including a front part and a rear part, and a first joint articulating said front part to said rear part about a first generally transverse, horizontally axis; and
   second and third joints respectively articulating said front part of said cross-beam to said front post and said rear part of said cross-beam to said rear part, about respective second and third generally transverse, horizontal axes to provide a frame, whereby, upon folding said frame to a collapsed position from an erect position, said front post is brought closer to said rear post as said first, second and third joints respectively articulate about said first, second and third axes and front and rear parts of said cross-beam thereby fold towards one another and respectively towards said front and rear posts;
   said cross-beam being a first, upper cross-beam, and said collapsible-frame bicycle further comprising:
   a second, lower cross-beam;
   said second cross-beam including a front part and a rear part, and a fourth joint articulating said front part of said second cross-beam to said rear part of said second crossbeam about a fourth generally transverse, horizontal axis; and
   fifth and sixth joints respectively articulating said front part of said second cross-beam to said front post and said rear part of said second cross-beam to said rear post, about respective fifth and sixth generally transverse, horizontal axes, whereby, upon folding of said frame ot said collapsed position from said erect position, said fourth, fifth and sixth joints respectively articulate about said fourth, fifth and sixth axes, said front and rear parts of said second cross-beam thereby fold towards one another and respectively towards said front and rear posts.

2. The collapsible-frame bicycle of claim 1, wherein: at least one of said first, second and third joints is structured to provide lateral shifting upon articulation so that whereas when said frame is in said erect position said rear wheel is substantially aligned with and disposed to track behind said front wheel, when said frame is moved to said collapsed position said front wheel becomes located transversally beside said front wheel while remaining generally aligned therewith.

3. The collapsible-frame bicycle of claim 1, wherein: said first through sixth joints are structured such that as said frame is folded to said collapsed position from said erect position, said first joint moves downwards and said fourth joint moves upwards.

4. The collapsible-frame bicycle at claim 2, wherein: one of said second and third axes is substantially transversally oriented relative to said frame; and said first axis and the other of said second and third axes are oriented parallel to one another and oblique to substantial transversality relative to said frame, as seen in plan view, whereby as said cross-beam is folded to collapse said frame, the respective said part of said cross-beam which is associated with said one of said second and third axes pivots in a notional plane which contains the respective said post to which such part is directly pivotally connected by the respective one of said second and third pivot joints, and the respective said part of said cross-beam which is associated with said other of said second and third axes pivots in a notional plane which is tilted with respect to the respective said post to which such part is directly pivotally connected by the respective other of said second and third pivot joints.

5. The collapsible-frame bicycle of claim 4, wherein: the respective said joints which have said oblique axes are toggle joints each having respective formations which move into engagement as said frame is moved to said erect position and which out of engagement as said frame is moved ot said collapsed position, thereby providing the respective said joints with increased play as said cross-beam is folded.

6. The collapsible-frame bicycle of claim 1, wherein: at least one of said first, second and third joints, and, for each such joint, a vertically corresponding one of said fourth, fifth and sixth joints, are structured to provide lateral shifting upon articulation so that whereas when said frame is in said erect position said rear wheel is substantially aligned with and disposed to track behind said front wheel, when said frame is moved to said collapsed position, said front wheel becomes located transversally beside said rear wheel while remaining generally aligned therewith.

7. The collapsible-frame bicycle of claim 6, wherein: one of said second and third axes, and a vertically corresponding one of said fifth and sixth axes are substantially transversally oriented relative to said frame; and said first axis, said fourth axis, the other of said second and third axes and the other of said fifth and sixth axes are oriented parallel to one another and somewhat oblique to substantial transversality relative to said frame, as seen in plan view, whereby as said first and second cross-beams are folded to collapse said frame, the part of said first cross-beam which is associated with said one of said second and third axes and the part of said second cross-beam which is associated with said one of said fifth and sixth axes both pivot in a notional plane which contains the post to which such parts are directly connected respectively by the respective one of said second and third pivot joints and said fifth and sixth pivot joints, and the part of said first cross-beam which is associated with said other of said second and third axes and the part of said second cross-beam which is associated with the other of said fifth and sixth axes pivot in respective notional planes which are parallel to one another but tilted with respect to the post to which such parts are respectively directly pivotally connected by the respective other of said second and third pivot joints and said fifth and sicth pivot joints.

8. The collapsible-frame bicycle of claim 7, wherein: the respective said joints which have said oblique axes are toggle joints each having respective formations which move into engagement as said frame is moved to said erect positin and which move out of engagement as said frmae is moved to said collapsed position, thereby providing the respective said joints with increased play as said first and second cross-beam are folded.

9. The collapsible-frame bicycle of claim 1, wherein: said cross-beam further includes releasable means for locking said first joint, to maintain said frame in said erect position.

10. The collapsible-frame bicycle of claim 9, wherein: said releasable locking means comprises a spring-loaded lock bolt which extends generally longitudinally of said cross-beam, across said first joint.

11. The collapsible-frame bicycle of claim 1, wherein: at least one of said first and second cross-beams further includes releasable means for locking the respective one of said first and fourth joints, to maintain said frame in said erect position.

12. The collapsible-frame bicycle of claim 11, wherein: each said releasable locking means comprises a spring-loaded lock bolt which extends generally longitudinally of the respective one of said first and second said cross-beams, across the respective said joint.

13. The collapsible-frame bicycle of claim 1, further including: releasable means secured to said frame for holding together said front and rear posts when said frame is in said collapsed position.

* * * * *